United States Patent
McLoughlin et al.

(10) Patent No.: US 8,344,871 B2
(45) Date of Patent: Jan. 1, 2013

(54) INTEGRATED VEHICULAR SCENE/WARNING LIGHT ASSEMBLY

(76) Inventors: John E. McLoughlin, Hauppauge, NY (US); Neocles G. Athanasiades, E. Setauket, NY (US); Kiam Meng Toh, Hauppauge, NY (US)

( * ) Notice: Subject to any disclaimer, the term of this patent is extended or adjusted under 35 U.S.C. 154(b) by 319 days.

(21) Appl. No.: 12/945,595

(22) Filed: Nov. 12, 2010

(65) Prior Publication Data

US 2012/0119899 A1    May 17, 2012

(51) Int. Cl.
*B60Q 1/26* (2006.01)

(52) U.S. Cl. .... 340/469; 340/468; 340/472; 340/815.45

(58) Field of Classification Search ............... 340/469, 340/468, 472, 815.45, 815.65, 458, 461, 340/463, 464, 471, 478, 479; 362/499, 507, 362/509, 545, 800
See application file for complete search history.

(56) References Cited

U.S. PATENT DOCUMENTS

| | | | |
|---|---|---|---|
| 5,736,925 A * | 4/1998 | Knauff et al. ............... 340/468 |
| 6,431,728 B1 | 8/2002 | Fredericks et al. | |
| 6,700,502 B1 | 3/2004 | Pederson | |
| 7,500,770 B2 * | 3/2009 | Medina ......................... 362/473 |
| 8,125,327 B2 * | 2/2012 | Ognibene ..................... 340/479 |
| 2010/0110660 A1 | 5/2010 | Brukilacchio | |
| 2010/0244748 A1 * | 9/2010 | Haab et al. ..................... 315/313 |

* cited by examiner

*Primary Examiner* — Anh V La
(74) *Attorney, Agent, or Firm* — Wei Wei Jeang; Andrews Kurth LLP

(57) ABSTRACT

A vehicular integrated light assembly comprises a first and second pluralities of LEDs arranged on a circuit board, and a controller electrically coupled to the first and second pluralities of LEDs. The light assembly further comprises a housing and at a lens hermetically sealing the circuit board and first and second pluralities of LEDs within the housing. The controller is operable to operate in a warning light mode in which the first plurality of LEDs emit a bright light in a first predetermined color and flash in a first predetermined sequence, and the second plurality of LEDs emit a bright light in a second predetermined color and flash in an alternating sequence from the first predetermined sequence. The controller is further operable to transition to a scene light mode in which the second plurality of LEDs emit a steady bright light in the second predetermined color to illuminate the surroundings.

20 Claims, 3 Drawing Sheets

INTEGRATED VEHICULAR SCENE/WARNING LIGHT ASSEMBLY

FIELD OF THE INVENTION

This invention relates generally to a light emitting diode light assembly, and in particular to an integrated scene/warning light assembly for emergency vehicle applications.

BACKGROUND

Emergency vehicles including police cars, fire trucks, and ambulance vehicles generally use a plurality of warning signal lights capable of producing light in various colors and flashing or rotating patterns. The primary purpose of the warning light is to greatly increase the visibility of the emergency vehicles, which are often required to travel at high speed to a site requiring emergency services.

Recent improvements in light emitting diode (LED) technology enabled the generation of high intensity light in various colors, while having the benefits of energy efficiency and compact assembly. These advantages in the LED technology have prompted the incorporation of LEDs in warning signal lights for emergency vehicles.

BRIEF DESCRIPTION OF THE DRAWINGS

For a more complete understanding of the disclosure and the advantages thereof, reference is now made to the accompanying drawings, wherein similar or identical reference numerals represent similar or identical items.

DETAILED DESCRIPTION

Figure 1:
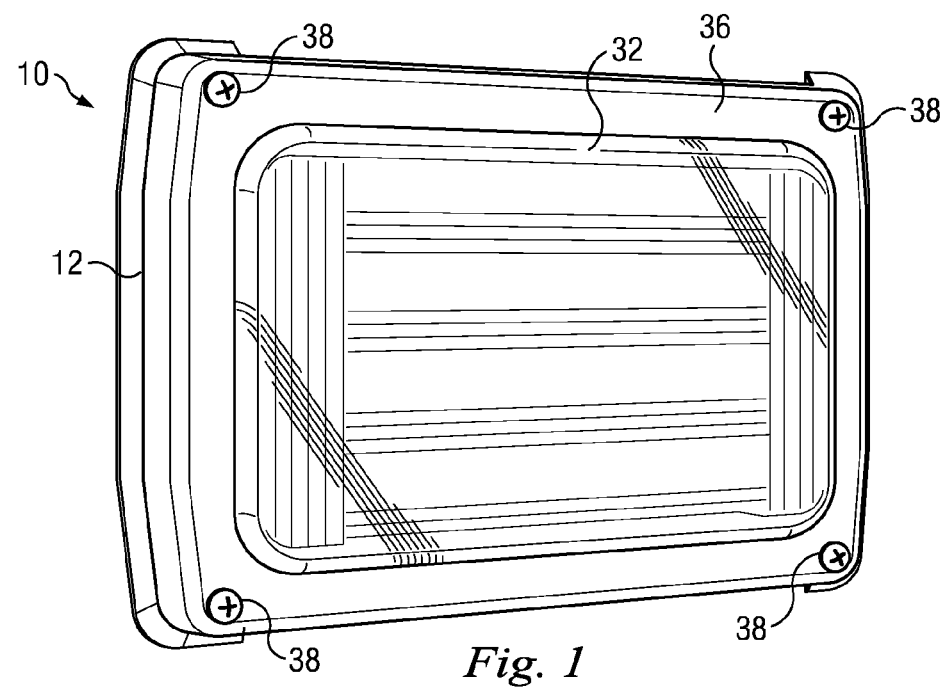
FIG. 1 is a perspective view of an embodiment of the integrated vehicular scene/warning light assembly.
Figure 2:
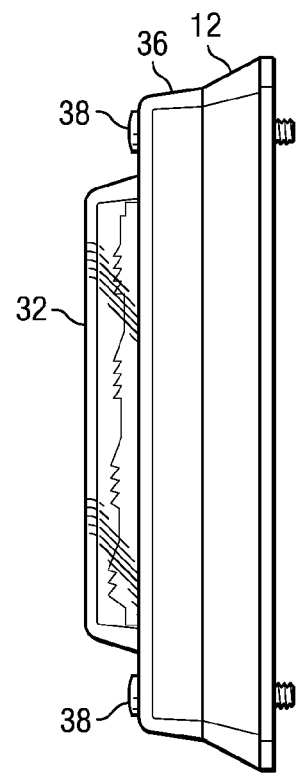
FIG. 2 is a side view of an embodiment of the integrated vehicular scene/warning light assembly.
Figure 3:
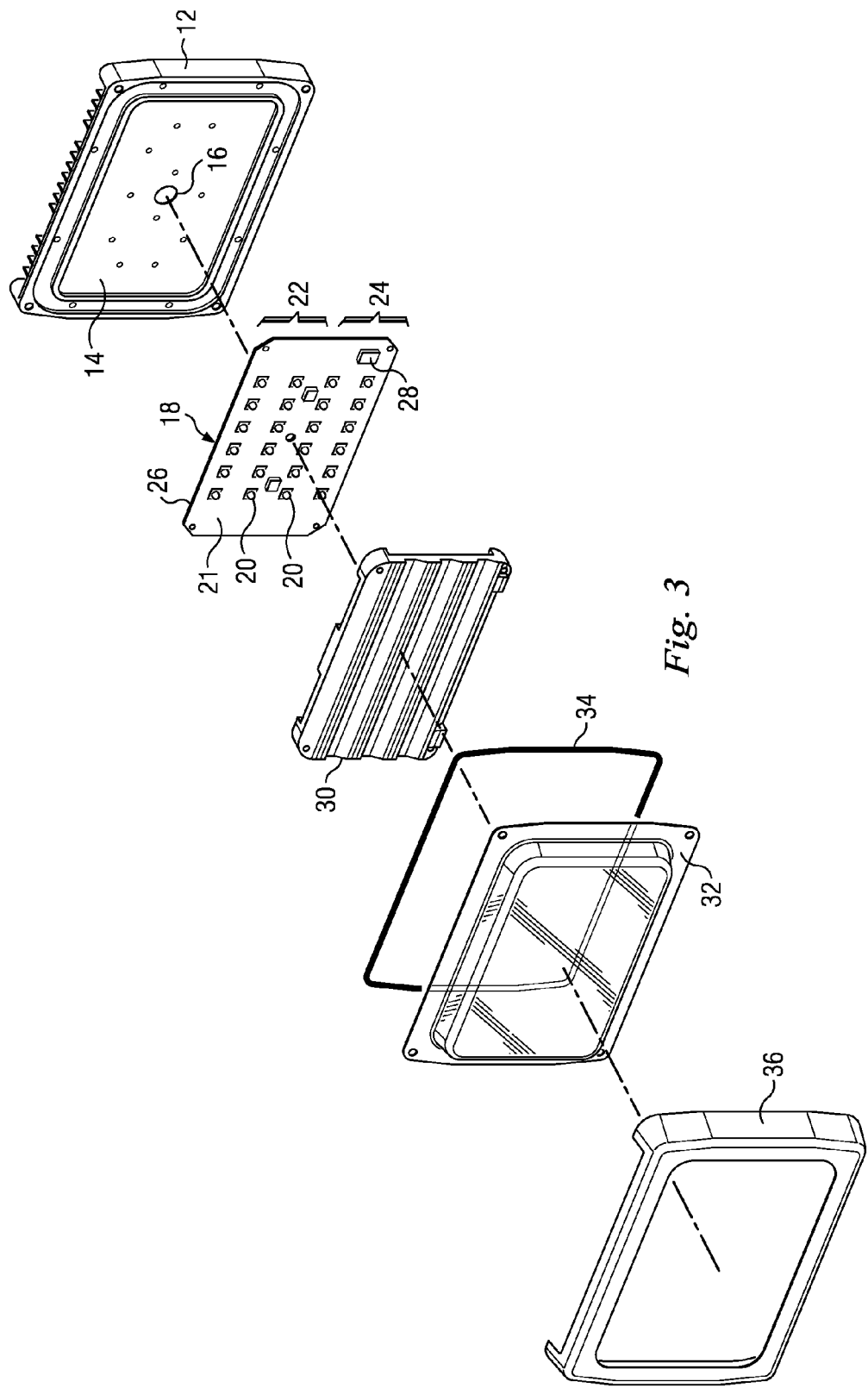
FIG. 3 is an exploded view of an embodiment of the integrated vehicular scene/warning light assembly.
Figure 4:
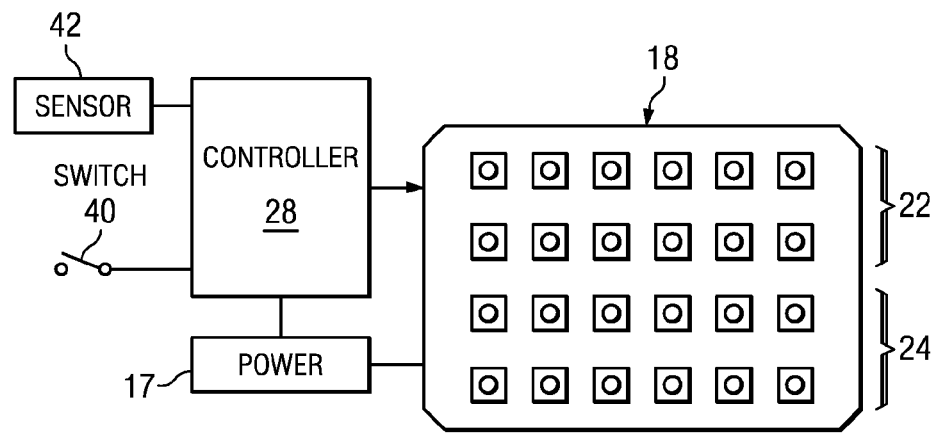
FIG. 4 is a schematic diagram of an embodiment of the integrated vehicular scene/warning light assembly.
Figure 5:
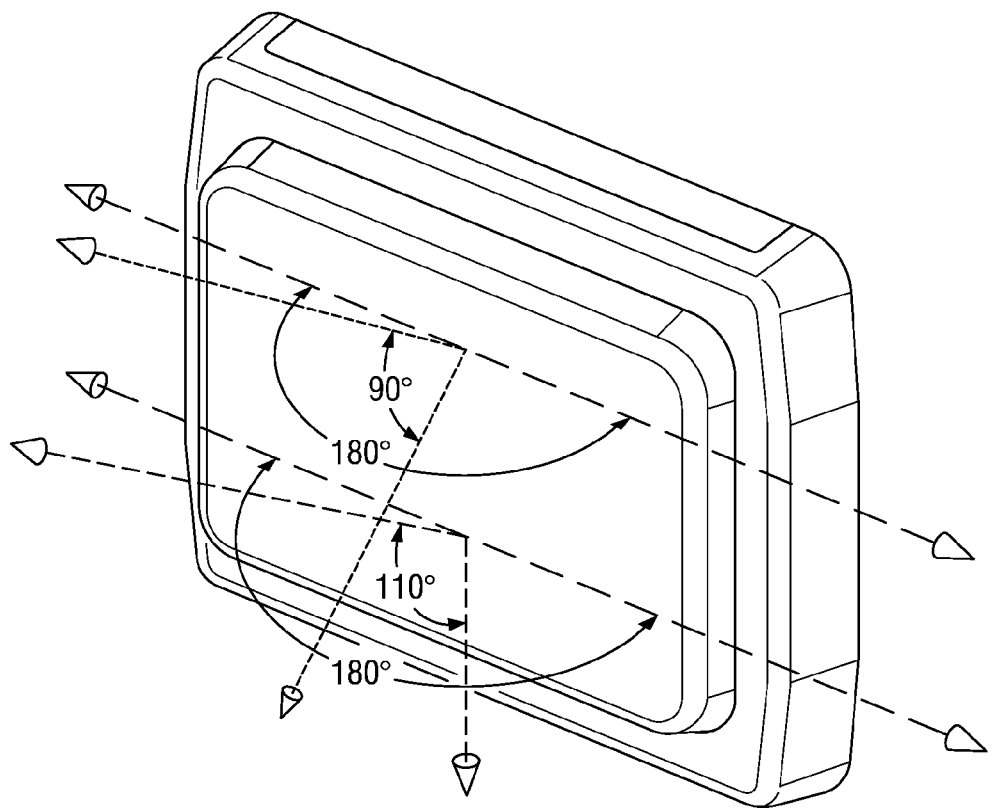
FIG. 5 is a perspective view of an embodiment of the integrated vehicular scene/warning light assembly mounted on the side of an emergency vehicle.

FIG. 1 is a perspective view of an embodiment of an integrated vehicular scene/warning light assembly 10. Reference is also made to FIG. 2 for a side view and to FIG. 3 of the integrated vehicular scene/warning light assembly 10. FIG. 4 further provides a schematic diagram of the integrated light assembly. Integrated light assembly 10 includes a housing 12 which may be constructed from molded plastic or another appropriate material and fabrication method now known or later developed. Housing 12 includes mounting and fastening means, such as screws, bolts or other mechanism (not explicitly shown) for securing light assembly 10 to the front, side, or back of an emergency vehicle. An emergency vehicle may have mounted thereon a plurality of integrated light assemblies to enable the warning signal light to be seen from all directions when in the warning light or travel mode, and to further enable scene lighting of the surrounding areas when in the scene light or on-site mode. Housing 12 also includes a back plane 14 defining a through-hole 16 for accommodating a plurality of conductive wires connecting circuitry on a printed circuit board 18 and a power supply 17 on-board the emergency vehicle. A sealing gasket may be employed to hermetically seal around the wiring in the through-hole. Housing 12 further preferably defines a shallow recess configured to receive printed circuit board 18. The construction and configuration of housing 12 permits integrated light assembly 10 to be flush-mounted onto the body of the emergency vehicle.

Printed circuit board 18 includes a matrix of light emitting diodes (LEDs) 20 arranged and mounted on a front side 21 of the printed circuit board in a predetermined pattern. Printed circuit board 18 is securely fastened within the recess of housing 12 by conventional means. The plurality of LEDs 20 are arranged in an upper portion 22 and a lower portion 24, where upper portion LEDs 22 are operable to emit bright intensity light in a first color, and second portion LEDs 24 are operable to emit bright intensity light in a second color different from the first color. As shown in FIG. 2, the number of upper portion LEDs 22 are identical to the number of lower portion LEDs 24, but alternative embodiments where unequal numbers of LEDs in the upper and lower portions are also contemplated. A controller 28 mounted on the front side 21 or a backside 26 of printed circuit board 18 is electrically coupled to the plurality of LEDs 20 to control their operation. Alternately, upper and lower portion LEDs 22 and 24 may be mounted on separate printed circuit boards, both electrically coupled to controller 28. Other electrical or electronic components and circuitry may be mounted on the circuit board as needed. Details of the operations of integrated vehicular scene/warning light assembly 10 are set forth below.

Integrated light assembly 10 further includes a first lens 30 acting as an inner lens disposed directly over printed circuit board 18. A second lens 32 acting as an outer lens and cover is disposed over first lens 30. Second lens 32 further includes a seal such as an O-ring or gasket 34 that is operable to hermetically seal and enclose printed circuit board 18 and LEDs 20 mounted thereon within housing 12. The combination of first and second lenses 30 and 32 is designed to direct light emitted from the LEDs 20 to achieve a desirable beam spread vertically and horizontally. Details of the desired light beam spread are set forth below. First and second lenses 30 and 32 may be constructed of molded lexan or another suitable material and fabrication method now known or later developed. As an alternative or in addition to using LEDs that are operable to emit different colors of light, lenses 30 and 32 may be colored to generate light of a desired color. In an alternate embodiment, first and second lenses 30 and 32 may be a single integrated lens that achieves identical or similar functions.

Installed over second lens 32 is a bezel 36. Bezel 36 snuggly fits over second lens 32 and is securely fastened to second lens 32, first lens 30, and housing 12 using conventional fasteners, such as four mounting screws or bolts at the four corners of the integrated light assembly, for example. Other alternative mechanism for securing the integrated light assembly components may also be used. As shown in FIG. 2, first and second lenses 30 and 32 project beyond the plane of bezel 36, so that light emitting from the LEDs 20 may be unobstructed by the bezel.

The combination of first and second lenses 30 and 32 is designed to direct light emitted from the LEDs 20 to achieve a desirable beam spread vertically and horizontally. For example, it is desirable to direct the scene lighting so that the vertical sides of the emergency vehicle are illuminated, as well as the ground on which the vehicle is parked and the surrounding scene. Further, it is desirable that the scene lighting achieves a certain angle of beam spread above the horizontal. For example as shown in FIG. 4, it may be desirable to provide a scene lighting vertical beam spread from lower portion LEDs 34 of about at least 110 degrees, and a horizontal beam spread of about at least 180 degrees. Additionally, it may be desirable to provide a warning light vertical beam spread from upper portion LEDs 32 of about at least 90 degrees, and a horizontal beam spread of about at least 180 degrees.

In operation, controller 28 may control the coordinated flashing sequences of upper portion LEDs 22 and lower portion LEDs 24 while the emergency vehicle is en route to the emergency scene, so that integrated vehicular scene/warning light assembly 10 functions as a warning signal light. Accordingly, when operating in the warning light mode, upper portion LEDs 22 may emit bright intensity light in a first color, such as red, and lower portion LEDs 24 may emit bright intensity light in a second color, such as white, where the upper and lower portion LEDs alternately turn on and off in a flashing sequence. Alternatively, upper and lower portion LEDs 22 and 24 may flash in other color combinations, such as blue and white, amber and white, red and blue, etc.

Once upon arrival at the emergency scene, controller 28 may operate lower portion LEDs 24 to provide a steady bright light, so that integrated vehicular scene/warning light assembly 10 may function as a scene light to provide general lighting of the emergency scene. Accordingly, when operating in the scene light mode, upper portion LEDs 22 may emit bright intensity light in the first color, such as red, in a flashing sequence, and lower portion LEDs 24 may emit bright intensity light in the second color, such as white, in a steady manner to provide maximum illumination. Alternatively, other color combinations and/or flashing sequences may be used. Further, it is contemplated that the LEDs may be arranged in a different orientation other than as described herein.

Controller 28 may automatically set the integrated light assembly to warning light mode or scene light mode depending on some predetermined operating parameters of the vehicle. For example, if the emergency vehicle is put in park, the controller may automatically sense this condition and switch the integrated light assembly from the warning light mode to the scene light mode. Alternatively, a human operator may manually set the integrated light assembly to the desired operating mode using a switch 40, for example. The operation of the integrated light assembly may also utilize a combination of a human operator switch to activate the integrated light assembly system having a plurality of light assemblies, and selectively operating in warning light mode or scene light mode in response to the emergency vehicle being in park or out of park. As another alternative, a motion sensor or another type of sensor 42 may be used to determine which operating mode is desired. In an alternate embodiment, controller 28 may be installed elsewhere in the vehicle rather than on circuit board 18 with the plurality of LEDs 20. For example, a single controller may be used to control a plurality of integrated light assemblies installed on an emergency vehicle.

The integrated vehicular scene/warning light assembly described herein is a compact assembly that is economical in space and economical to operate. The integrated light assembly combines the functions of a warning light and a scene light in one compact assembly that can be surface (flush) mounted on a vehicle without panel cut-outs in the vehicle. As a result of the combined integrated light, cost-savings on the overall vehicle is also achieved.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various methods, techniques, or elements may be combined or integrated in another system, or certain features may be omitted or not implemented.

What is claimed is:

1. An emergency vehicle integrated light assembly comprising:
    a first plurality of light emitting diodes arranged in a first predetermined pattern on a circuit board;
    a second plurality of light emitting diodes arranged in a second predetermined pattern on the circuit board proximate to the first plurality of light emitting diodes;
    a controller electrically coupled to the first and second pluralities of light emitting diodes;
    a housing accommodating the circuit board and first and second pluralities of light emitting diodes;
    at least one lens disposed and mounted over the housing and hermetically sealing the circuit board and first and second pluralities of light emitting diodes within the housing;
    the controller operable to operate in a warning light mode in which the first plurality of light emitting diodes emit a bright intensity light in a first predetermined color and flash in a first predetermined sequence, and the second plurality of light emitting diodes emit a bright intensity light in a second predetermined color and flash in an alternating sequence from the first predetermined sequence to provide warning signal lighting; and
    the controller further operable to transition to a scene light mode in which the first plurality of light emitting diodes emit a bright intensity light in the first predetermined color and flash in the first predetermined sequence, and the second plurality of light emitting diodes emit a steady bright intensity light in the second predetermined color to illuminate the surrounding scene.

2. The emergency vehicle integrated light assembly of claim 1, further comprising a sensor operable to sense an operating condition of the emergency vehicle and the controller operable to selectively operate in one of the warning light mode and scene light mode in response to the sensed emergency vehicle operating condition.

3. The emergency vehicle integrated light assembly of claim 1, wherein the controller operable to selectively operate in the scene light mode in response to the emergency vehicle being in park, and in the warning light mode in response to the emergency vehicle not being in park.

4. The emergency vehicle integrated light assembly of claim 1, further comprising a switch enabling a human operator to selectively operate the controller in one of the warning light mode and scene light mode.

5. The emergency vehicle integrated light assembly of claim 1, further comprising a switch enabling a human operator to selectively activate the integrated light assembly.

6. The emergency vehicle integrated light assembly of claim 1, further comprising a motion sensor operable to sense infrared motion proximate the emergency vehicle and the controller operable to selectively operate in one of the warning light mode and scene light mode in response to the sensed motion.

7. The emergency vehicle integrated light assembly of claim 1, wherein the at least one lens comprises:
    an inner lens disposed over the circuit board and first and second pluralities of light emitting diodes; and
    an outer lens disposed over the inner lens.

8. The emergency vehicle integrated light assembly of claim 7, further comprising a bezel disposed and mounted over the outer lens and securely fastened to the housing.

9. The emergency vehicle integrated light assembly of claim 1, wherein the first plurality of light emitting diodes are mounted above the second plurality of light emitting diodes on the circuit board.

10. The emergency vehicle integrated light assembly of claim 1, wherein the at least one lens enabling the light emitted from the first plurality of light emitting diodes to have a vertical beam spread of at least about 90 degrees, and a horizontal beam spread of at least 180 degrees, and further enabling the light emitted from the second plurality of light emitting diodes to have a vertical beam spread of at least about 110 degrees, and a horizontal beam spread of at least 180 degrees.

11. The emergency vehicle integrated light assembly of claim 1, wherein the first and second plurality of light emitting diodes are operable to emit, through the at least one lens, bright intensity light in a color selected from the group consisting of white, red, blue, orange, and yellow.

12. An emergency vehicle integrated warning/scene light system comprising:
    a plurality of integrated warning/scene light assemblies mounted at predetermined locations on the emergency vehicle, each integrated warning/scene light assembly comprising:
        a circuit board;
        a first plurality of light emitting diodes mounted on the circuit board;
        a second plurality of light emitting diodes mounted on the circuit board proximate to the first plurality of light emitting diodes;
        a housing accommodating the circuit board and first and second pluralities of light emitting diodes; and
        at least one lens disposed and mounted over the housing and hermetically sealing the circuit board and first and second pluralities of light emitting diodes within the housing;
    a controller electrically coupled to the plurality of integrated warning/scene light assemblies, the controller operable to operate the system in a warning light mode in which the first plurality of light emitting diodes emit a bright intensity light in a first predetermined color and flash in a first predetermined sequence, and the second plurality of light emitting diodes emit a bright intensity light in a second predetermined color and flash in an alternating sequence from the first predetermined sequence to provide warning signal lighting; and
    the controller further operable to transition the system to a scene light mode in which the first plurality of light emitting diodes emit a bright intensity light in the first predetermined color and flash in the first predetermined sequence, and the second plurality of light emitting diodes emit a steady bright intensity light in the second predetermined color to illuminate the surrounding scene.

13. The emergency vehicle integrated warning/scene light system of claim 12, further comprising a sensor operable to sense an operating condition of the emergency vehicle and the controller operable to selectively operate in one of the warning light mode and scene light mode in response to the sensed emergency vehicle operating condition.

14. The emergency vehicle integrated warning/scene light system of claim 12, further comprising a switch enabling a human operator to selectively operate the system in one of the warning light mode and scene light mode.

15. The emergency vehicle integrated warning/scene light system of claim 12, further comprising a switch enabling a human operator to selectively activate the integrated warning/scene light system.

16. The emergency vehicle integrated warning/scene light system of claim 12, further comprising a motion sensor operable to sense infrared motion proximate the emergency vehicle and the controller operable to selectively operate the system in one of the warning light mode and scene light mode in response to the sensed motion.

17. The emergency vehicle integrated warning/scene light system of claim 12, comprising:
    an inner lens disposed over the circuit board and first and second pluralities of light emitting diodes;
    an outer lens disposed over the inner lens; and
    a bezel disposed and mounted over the outer lens and securely fastened to the housing.

18. The emergency vehicle integrated warning/scene light system of claim 12, wherein the first plurality of light emitting diodes are mounted above the second plurality of light emitting diodes on the circuit board.

19. The emergency vehicle integrated warning/scene light system of claim 12, wherein the at least one lens enabling the light emitted from the first plurality of light emitting diodes to have a vertical beam spread of at least about 90 degrees, and a horizontal beam spread of at least 180 degrees, and further enabling the light emitted from the second plurality of light emitting diodes to have a vertical beam spread of at least about 110 degrees, and a horizontal beam spread of at least 180 degrees.

20. An emergency vehicle having an integrated warning/scene light system comprising:
    a plurality of integrated warning/scene light assemblies mounted at predetermined locations on the emergency vehicle, each integrated warning/scene light assembly comprising:
        a circuit board;
        a first plurality of light emitting diodes mounted on the circuit board;
        a second plurality of light emitting diodes mounted on the circuit board proximate to the first plurality of light emitting diodes;
        a housing accommodating the circuit board and first and second pluralities of light emitting diodes; and
        at least one lens disposed and mounted over the housing and hermetically sealing the circuit board and first and second pluralities of light emitting diodes within the housing;
    a controller electrically coupled to the plurality of integrated warning/scene light assemblies, the controller operable to operate the system in a warning light mode while the emergency vehicle is traveling en route to an incident scene, in which the first plurality of light emitting diodes emit a bright intensity light in a first predetermined color and flash in a first predetermined sequence, and the second plurality of light emitting diodes emit a bright intensity light in a second predetermined color and flash in an alternating sequence from the first predetermined sequence to provide warning signal lighting; and
    the controller further operable to transition the system to a scene light mode while the emergency vehicle is in park at the incident scene, in which the first plurality of light emitting diodes emit a bright intensity light in the first predetermined color and flash in the first predetermined sequence, and the second plurality of light emitting diodes emit a steady bright intensity light in the second predetermined color to illuminate the surrounding scene.

* * * * *